United States Patent
Saini et al.

(10) Patent No.: US 12,041,483 B2
(45) Date of Patent: Jul. 16, 2024

(54) WIRELESS NETWORK CONTENTION REDUCTION THROUGH DYNAMIC RADIO FREQUENCY PARAMETERS

(71) Applicant: Cisco Technology, Inc., San Jose, CA (US)

(72) Inventors: Vinay Saini, Bengaluru (IN); Robert E. Barton, Richmond (CA); Jerome Henry, Pittsboro, NC (US); Vishal S. Desai, San Jose, CA (US); Matthew A. Silverman, Shaker Heights, OH (US); John M. Swartz, Lithia, FL (US); Joshua D. Suhr, Lenexa, KS (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 17/446,920

(22) Filed: Sep. 3, 2021

(65) Prior Publication Data

US 2023/0073742 A1    Mar. 9, 2023

(51) Int. Cl.
*H04W 28/02* (2009.01)
*H04L 41/147* (2022.01)
*H04W 28/06* (2009.01)

(52) U.S. Cl.
CPC ....... *H04W 28/0289* (2013.01); *H04L 41/147* (2013.01); *H04W 28/0284* (2013.01); *H04W 28/06* (2013.01)

(58) Field of Classification Search
CPC ......... H04W 28/0289; H04W 28/0284; H04W 28/06
See application file for complete search history.

(56) References Cited

U.S. PATENT DOCUMENTS

| | | | |
|---|---|---|---|
| 10,674,373 B1* | 6/2020 | Lewis | H04W 16/18 |
| 2015/0327164 A1* | 11/2015 | Madan | H04L 43/045 |
| | | | 370/254 |
| 2016/0295357 A1* | 10/2016 | Grayson | H04W 68/02 |
| 2017/0034826 A1* | 2/2017 | Shahar | H04J 11/0056 |
| 2018/0063851 A1 | 3/2018 | Abraham et al. | |
| 2018/0084429 A1 | 3/2018 | Guo et al. | |
| 2019/0150134 A1 | 5/2019 | Kakinada et al. | |
| 2019/0230047 A1 | 7/2019 | McBride et al. | |
| 2019/0342795 A1 | 11/2019 | McFarland et al. | |
| 2021/0235342 A1* | 7/2021 | Zhu | H04B 7/01 |
| 2022/0014963 A1* | 1/2022 | Yeh | G06N 3/0445 |
| 2022/0303783 A1* | 9/2022 | Khoshnevisan | H04W 4/06 |

OTHER PUBLICATIONS cisco.com, "RRM Data Collection Activities," Radio Resource Management White Paper, dated Jan. 26, 2018, pp. 1-3.
Qualcomm, "Qualcomm Wi-Fi SON and Distributed Networking," Year: 2021, pp. 1-6.

* cited by examiner

*Primary Examiner* — Omer S Mian
(74) *Attorney, Agent, or Firm* — Patterson + Sheridan, LLP

(57) ABSTRACT

Techniques for wireless network management are provided. A set of characteristics data for a plurality of different wireless networks in a common physical space is collected, and it is determined, based on the set of characteristics data, that the plurality of wireless networks are experiencing spectrum contention. A set of radio frequency (RF) parameter modifications is generated based on the set of characteristics data, and one or more of the plurality of wireless networks are instructed to implement the set of RF parameter modifications. A second set of characteristics data is collected for the plurality of wireless networks.

20 Claims, 9 Drawing Sheets

WIRELESS NETWORK CONTENTION REDUCTION THROUGH DYNAMIC RADIO FREQUENCY PARAMETERS

TECHNICAL FIELD

Embodiments presented in this disclosure generally relate to wireless networking. More specifically, embodiments disclosed herein relate to dynamically controlling wireless networks to reduce contention.

BACKGROUND

In a wide variety of settings, such as multi-tenant apartments or office buildings, the density of access points (APs) on different networks can cause high channel utilization and interference, resulting in poor performance for all clients. Additionally, in conventional systems, each AP generally operates at or near its highest power settings in order to maximize its own capabilities at all times. However, in many cases, the actual traffic on each network is fairly time-specific, resulting in sub-optimal use of the wireless spectrum and reduced overall performance of the networks.

Moreover, in conventional systems, each individual network can only survey the usage of each channel of external networks, and attempt to optimally set channel usage across APs that are within the single network. As networks change channels over time (e.g., due to dynamic frequency selection, interference avoidance, or changes in the environment), a cascade of changes can be triggered in the external networks, as they attempt to adjust. However, all these efforts are ineffective, as there is no central repository or controller.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
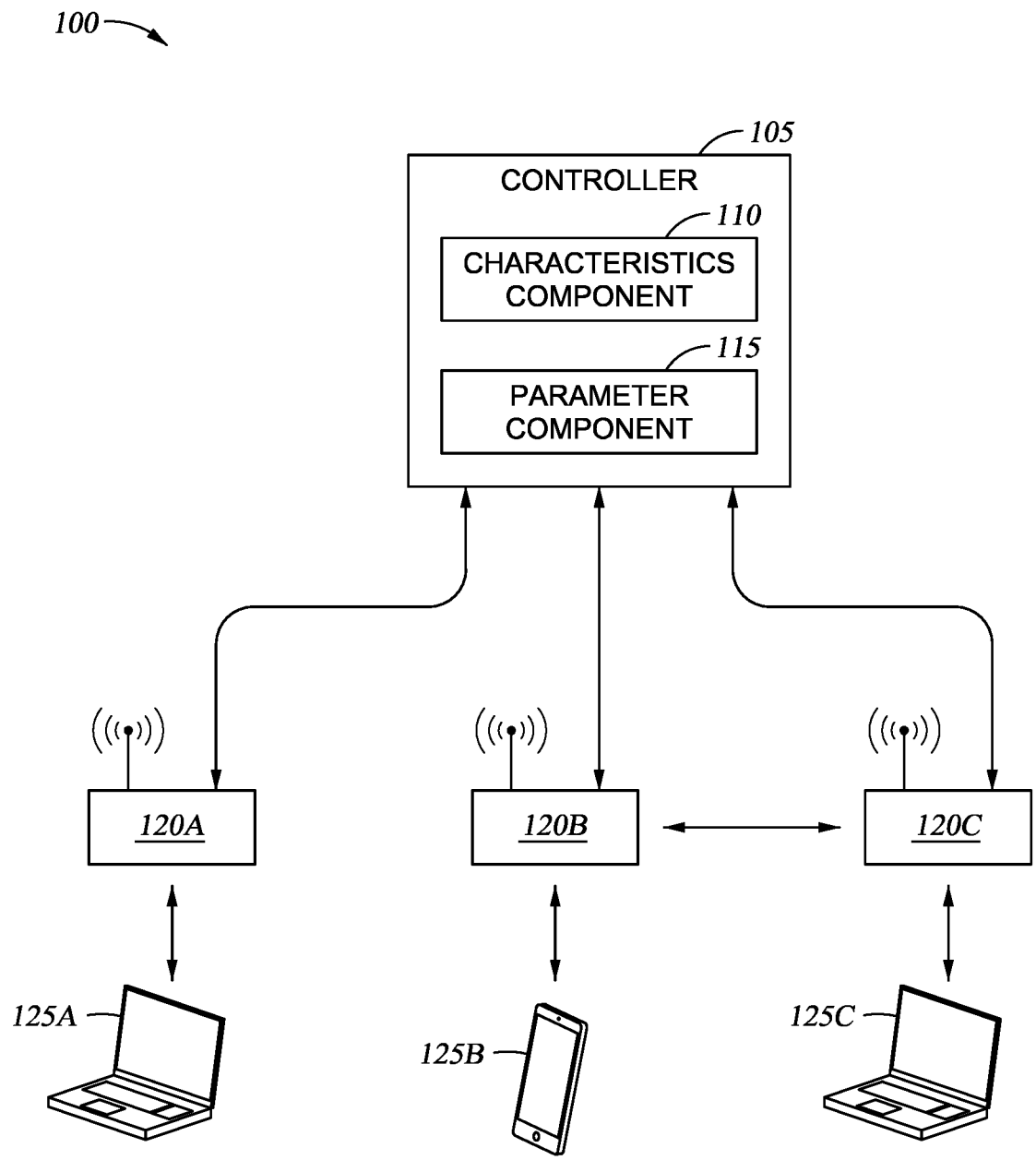
FIG. 1 depicts an example system to provide coordinated resource management among overlapping wireless networks, according to some embodiments disclosed herein.

According to one embodiment presented in this disclosure, a method is provided. The method includes: collecting a first set of characteristics data for a plurality of wireless networks in a common physical space; determining, based on the first set of characteristics data, that the plurality of wireless networks are experiencing spectrum contention; generating a first set of radio frequency (RF) parameter modifications based on the first set of characteristics data; instructing one or more of the plurality of wireless networks to implement the first set of RF parameter modifications; and collecting a second set of characteristics data for the plurality of wireless networks.

According to a second embodiment of the present disclosure, a computer product is provided. The computer product comprises logic encoded in a non-transitory medium, the logic executable by operation of one or more computer processors to perform an operation comprising: collecting a first set of characteristics data for a plurality of wireless networks in a common physical space; determining, based on the first set of characteristics data, that the plurality of wireless networks are experiencing spectrum contention; generating a first set of radio frequency (RF) parameter modifications based on the first set of characteristics data; instructing one or more of the plurality of wireless networks to implement the first set of RF parameter modifications; and collecting a second set of characteristics data for the plurality of wireless networks.

According to a third embodiment of the present disclosure, a system is provided. The system comprises one or more computer processors; and logic encoded in a non-transitory medium, the logic executable by operation of the one or more computer processors to perform an operation comprising: collecting a first set of characteristics data for a plurality of wireless networks in a common physical space; determining, based on the first set of characteristics data, that the plurality of wireless networks are experiencing spectrum contention; generating a first set of radio frequency (RF) parameter modifications based on the first set of characteristics data; instructing one or more of the plurality of wireless networks to implement the first set of RF parameter modifications; and collecting a second set of characteristics data for the plurality of wireless networks.

EXAMPLE EMBODIMENTS

In aspects of the present disclosure, a centralized controller component can generate and apply cohesive radio frequency (RF) parameters to overlapping wireless networks based on collected characteristic data and/or performance data from each network. For example, based on data such as network telemetry, connection characteristics, traffic criticality, and the like, the controller can dynamically adjust the RF parameters of access points (APs) on each network in order to reduce network contention while maintaining high network quality. This collective evaluation and control can significantly improve the functioning of each individual network, as compared to individual management.

In some embodiments, the controller evaluates characteristics of the network traffic itself on each network, such as the weakest client signal, the movement patterns of devices on the network, timing and nature of traffic on the network, and the like. The controller can then actively modify RF parameters based on this data (e.g., by reducing power on a given network when traffic is low or no human users are present), which substantially improves the performance of each network.

In some embodiments, the controller can additionally or alternatively evaluate characteristics such as the role of each network (e.g., the criticality of the underlying traffic) and enforce RF changes based on these roles. For example, a critical backhaul network may be afforded higher priority, as compared to an ordinary network for guests or users to connect. In one such embodiment, the controller's RF policies may be defined based at least in part on these roles, in order to ensure the most critical networks operate smoothly, even when high contention exists.

Generally, by evaluating statistics across multiple overlapping networks and collectively controlling the operations of each, aspects of the present disclosure can reduce wireless contention, improve network efficiency and operations, and reduce interruptions to client devices.

FIG. 1 depicts an example system 100 to provide coordinated resource management among overlapping wireless networks, according to some embodiments disclosed herein.

In the illustrated example, a set of APs 120A-C provide connectivity to a plurality of wireless networks (e.g., WiFi networks). For example, the AP 120A may correspond to a first network, while the APs 120B and 120C provide access to a second network. As illustrated, a client device 125A is connected to the AP 120A, while a client device 125B is connected to the AP 120B and client device 125C is connected to AP 120C. Although three APs 120 are depicted, in embodiments, there may be any number of APs and networks in the space. Additionally, in the illustrated example, the APs 120B and 120C are communicatively linked. For example, the APs 120B and 120C may form mesh network.

As discussed above, when two or more networks (e.g., the network provided by AP 120A and the network provided by APs 120B and 120C) are present in the same physical space, there is often overlap and wireless contention as the APs 120 interfere with each other, reducing wireless performance for each. In the illustrated system 100, therefore, a shared controller 105 can monitor and control one or more aspects of each network or AP 120, in order to reduce this contention and improve network performance.

In the illustrated example, the controller 105 includes a characteristics component 110 and parameter component 115. Although depicted as discrete components for conceptual clarity, the operations of the characteristics component 110 and parameter component 115 may be combined or distributed across any number of components. Generally, the characteristics component 110 and parameter component 115 may be implemented using hardware, software, or a combination of hardware and software.

In an embodiment, the characteristics component 110 collects and evaluates data characterizing each network. For example, in some aspects, the characteristics component 110 determines a role or criticality of each network. In some embodiments, the characteristics can include network telemetry data from each network, information about the weakest and/or strongest signals to client devices on each network, capabilities of the connected clients for each network, movement patterns, connection patterns, and/or transmission patterns of the clients, and the like.

For example, the characteristics component 110 may identify, for each network, the corresponding client device 125 with the weakest connection signal (either currently, within a defined window, or ever). This may correspond, for example, to a connected device at the edge of the wireless signal. In some embodiments, the controller 105 can ensure that the power of the corresponding AP(s) 120 are not reduced low enough such that this weakest connection would be harmed or broken.

As another example, based on the characteristics (such as the capabilities of each connected device and connection patterns and/or transmission patterns), the characteristics component 110 may generate one or more timelines of use for each network. Each timeline may indicate, for example, the typical or expected network characteristics for each of a plurality of time windows, allowing the controller to dynamically modify RF settings based on these timelines in order to ensure high performance for each network during its busy times, while potentially limiting the network(s), and thereby reducing interference on other networks, during their less busy times.

In an embodiment, the parameter component 115 can use the collected and evaluated characteristics to generate and implement modified RF parameters for each network or AP 120. In some embodiments, the parameter component 115 can dynamically modify these RF parameters over time, in order to respond to changing conditions (or to predicted changes). For example, if the characteristics indicate that one of the networks (e.g., the network provided by the APs 120B and 120C) is more critical, the parameter component 115 may monitor for contention or interference (such as during high-traffic times), and implement RF parameters that prioritize the APs 120B and 120C, while potentially reducing the capacity of the AP 120A.

As another example, the parameter component 115 can refer to the generated timelines for each network to predict or determine windows of time when one network should be prioritized (e.g., because of high traffic) while another can be safely de-prioritized (e.g., because the only connected devices are static/continuous transmitters such as IoT devices).

In embodiments, the parameter component 115 can generally control a wide variety of parameters, depending on the particular implementation. For example, in some embodiments, the parameter component 115 can control, for each network and/or each AP 120, the channel assignments and/or channel width, transmission power, and the like.

Although depicted as being directly coupled with each AP 120, in some embodiments, there may be one or more intervening devices or components between the controller 105 and each AP 120. For example, the controller 105 may act as a multi-domain controller, and one or more of the local networks may have local controllers. In one such embodiment, the controller 105 may instruct the local controllers to implement the indicated parameters, and the local controllers can directly modify the relevant APs 120 in the local network.

Figure 2:
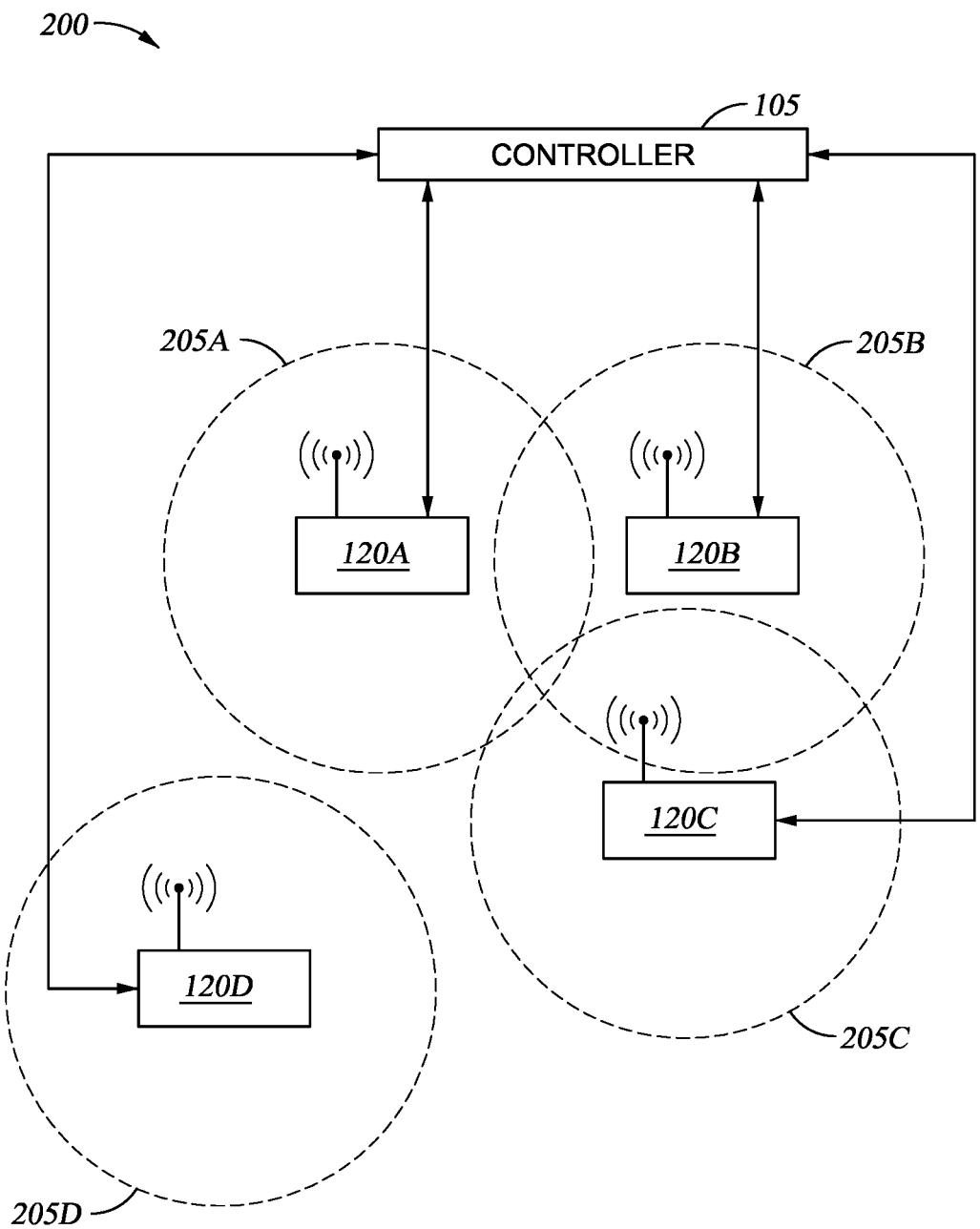
FIG. 2 depicts an example environment with overlapping networks in a common physical area, according to some embodiments disclosed herein.

FIG. 2 depicts an example environment 200 with overlapping networks in a common physical area, according to some embodiments disclosed herein.

In the illustrated example, four wireless networks 205A, 205B, 205C, and 205D are present in a physical space. Each network 205 is provided by a corresponding AP 120. Although four APs 120 and networks 205 are depicted, in embodiments, there may of course be any number of networks in the space. Additionally, though the illustrated example depicts networks 205 with circular coverage, in embodiments, the actual coverage of each network 205 may vary depending on a wide variety of factors. The indicated range of each network 205 is depicted using a dashed-line circle merely for conceptual clarity. As used herein, the "coverage" of the network 205 corresponds to the physical area(s) where the network 205 is visible to client devices, and/or where client devices are able to connect to the network 205.

As illustrated, the networks 205A, 205B, and 205C are at least partially overlapping. As used herein, two (or more) networks are said to be "overlapping" when there is at least one place in the physical space where a client device could see both networks, and/or could communicate with both APs or connect to either network (given any needed authentication). Such overlapping networks may be referred to as existing in a common or shared physical space or environment.

In the illustrated example, the network 205D does not overlap with any of the other networks 205. As discussed above, overlapping networks can generally create contention and interference in the wireless spectrum, significantly harming the operations of each network 205. In some embodiments, this dynamic RF control is used only for the dynamically-selected or identified group of APs 120 with overlapping networks 205. For example, the controller 105 may refrain from instructing or modifying the AP 120D, based on determining that it is not overlapping or interfering with the other networks 205. Of course, if such contention is later identified, the controller 105 may begin to control the AP 120D as well.

In some embodiments, the controller 105 only modifies the RF parameters of the overlap satisfies some criteria. This may include, for example, a minimum amount of interference or contention (e.g., as reflected in network telemetry), a minimum number of overlapping networks in the space, and the like.

In the environment 200, each AP 205 is connected to the controller 105. In some embodiments, the APs 120 may opt-in to the shared control, in order to improve the operations of each and reduce interference.

In at least one embodiment, the controller 105 is a centralized radio resource management (RRM) controller. The controller 105 may be present in the cloud or on-premises. As discussed above, the controller 105 can generally collect, over time, RF and sensing information from the APs 120 within the physical environment 200 (e.g., within a building or facility).

For example, in one embodiment, the centralized controller 105 can record, for each AP 120, the client(s) with the weakest signal, as well as the capabilities of each connected client (e.g., the supported channels and protocols of each). As discussed above, in some embodiments, the controller 105 can ensure that even if the transmission power of a given AP 120 needs to be reduced to reduce interference, the power is kept high enough that the client with the weakest signal can still connect. Similarly, if the channels or protocols are to be changed to reduce contention with other networks 205, the controller 105 can ensure that all the connected clients of each AP 120 can still use the newly-assigned channels and/or protocols.

In some embodiments, the controller 105 can also classify the connected devices to distinguish between continuous transmitters (e.g., IoT devices that regularly transmit status updates or pings) from occasional transmitters (e.g., laptops that only transmit data when in active use). For example, in many settings, it is common to have a number of smart objects that report their status at regular intervals, while other devices may display static signal but with sporadic traffic. These characteristics can be useful in defining appropriate RF parameters at a given time.

Further, in some embodiments, client devices may be moved (e.g. laptops and smartphones) and brought to communicate from remote areas (near the edge of the cell). In one embodiment, for such mobile devices, the controller 105 can record when the signal appears at the edge of the network 205 (e.g., signal is initially weak when the client device associates) and then improves, and/or if the signal appears at a stronger level, and then degrades as the device is moved (e.g., as the device nears the edge of the network 205). This movement can help inform the optimal RF configuration of the AP 120 at various times.

In an embodiment, the controller 105 can use this characteristics data to establish, for each AP 120, a minimal power level below which the AP 120 should not go based on the signal strength of any continuous transmitters and mobile devices appearing at the edge of the network 205.

Additionally, in some embodiments, the controller 105 can use time-series analysis to determine the time windows when mobile devices appear at the edge of each network 205. The centralized controller 105 may use this information to augment the RF parameters with possible different power boundaries for each individual time slice (e.g., such that the minimum allowable power for a given AP 120 changes depending on the particular time).

Though not included in the illustrated environment 105, in some embodiments, independent sensing agents may also be distributed through the environment 200 to collect information and report back to the coordinating controller 105. Additionally or alternatively, in some embodiments, some or all of the APs 120 may support collaborative sensing software which collects RF and channel data to be shared with the centralized controller 105. In one embodiment, this data can include, for example, the presence of active users in within a specific service area of each AP 120, constant roaming users and stationary users, and the like.

In one embodiment, each local controller (within the networks 205), AP 120, and/or sensing device registers with the controller 105 and transmits information about the RF channel use, channel utilization (CU), and other metrics to be mapped against the physical area and/or number of user present (and their states). A time-series graph can then be created based on the collected characteristics, where the graph describes the usage patterns and device movement in each area. Analytics of the available RF spectrum, the clients using the systems, and the currently deployed wireless systems can be performed to improve the RF environment.

In the illustrated example, based on the characteristics for each network 205, the controller 105 can communicate with each AP 120 (directly or indirectly) to suggest or instruct changes to their RF usage (such as channel size, air time fairness settings, power settings, and the like). For example, in regions or networks 205 where no users or devices are detected, the corresponding power of the AP 120 can be reduced to the minimum, and the channel size can be reduced (e.g., to 20 MHz) with accepted reuse (overlapping basic service set) for time windows with low-volume transmitters only (e.g. IoT devices). However, in one such embodiment, channel width can be increased for networks 205 and/or time windows where static signal or primarily downstream traffic devices are expected, which require more from the wireless system. Similarly, in some embodiments, power increases can be used when mobile devices are detected, and channel reuse tolerance can be reduced when bi-directional traffic volume increases.

For example, suppose for the networks 205A and 205B, there is little to no activity during certain windows of time, but the network 205C sees a larger amount of activity during these times. In some embodiments, the controller 105 can reduce the power on the APs 120A and 120B (associated with the networks 205A and 205B), and assign the best channels (e.g., the 40 or 80 MHz channels) to the AP 120C for the network 205C.

As another example, suppose activity in a given network 205A reduces at a certain time each day, but a few spikes of activity are seen on the AP 120A (e.g., because door and window sensors or other IoT devices are using the network). In contrast, suppose the network 205B displays activity spikes during this time (e.g., with steady downstream traffic, occasional bi-directional streams, and the like). In one embodiment, the controller 105 can change all or most of the APs 120A in the network 205A to 2.4 GHz (potentially leaving one or more of the APs in the network 205A on 5 GHz 40 MHz mode, to account for the intermittent spikes). Further, the AP 120B, as its sensing function detects human activity nearby (and thus potential need for connectivity), can be left on 5 GHz mode, but on 20 MHz width as strong traffic is not detected. Similarly, APs 120 with steady downstream traffic can be set to 40 MHz channels, with accepted channel reuse. Channels with the lowest reuse can be assigned to APs 120 with bi-directional traffic.

Of course, these modifications are merely included as examples for conceptual clarity, and the particular RF changes made for each AP 120 may vary depending on the particular characteristics, as well as the particular implementation of the controller 105. Additionally, in some embodiments, the controller 105 in the environment 200 can also or alternatively modify the RF parameters based further on network criticality and priority, as discussed below in more detail with reference to FIG. 3.

Figure 3:
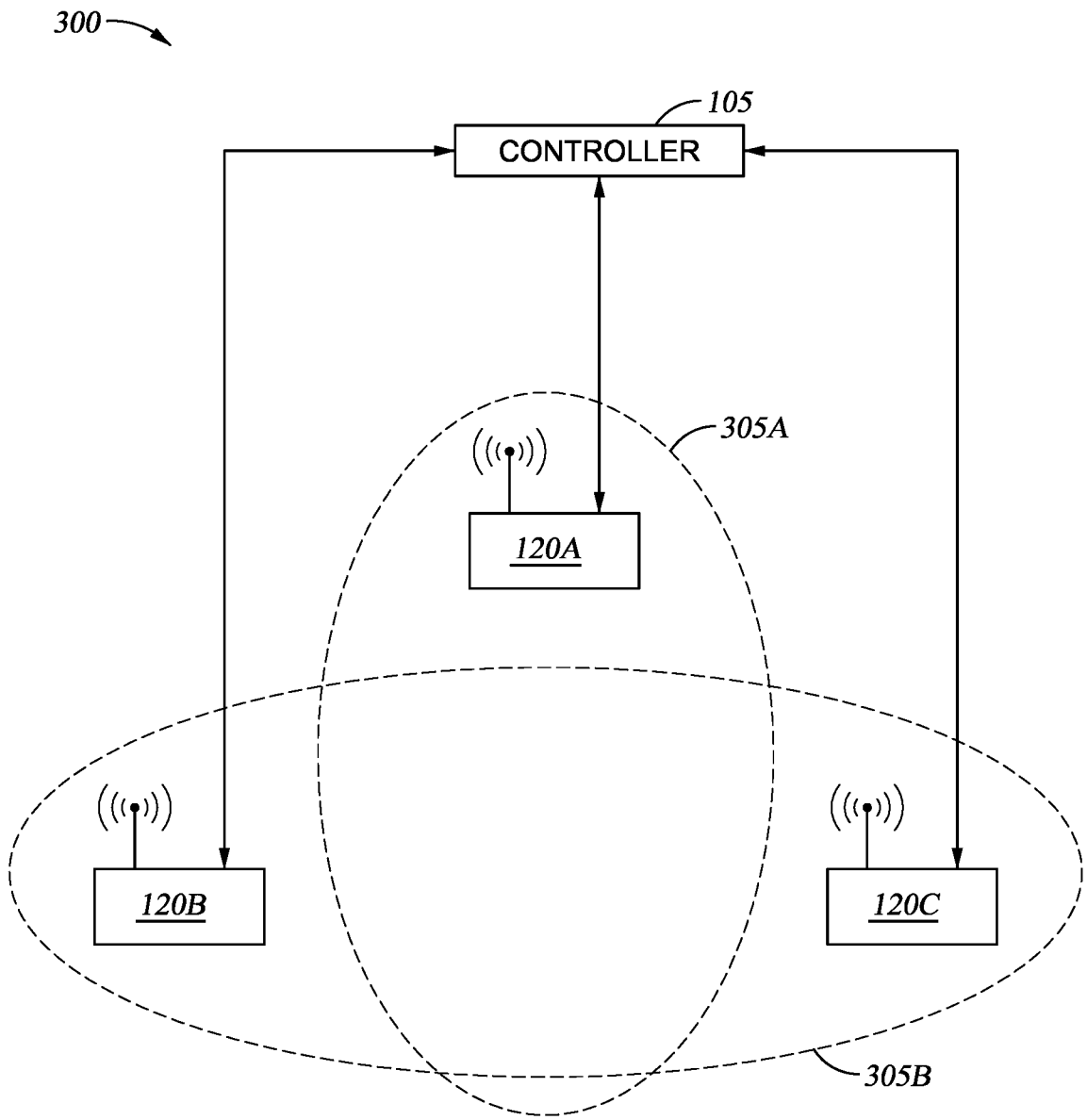
FIG. 3 depicts an example environment with overlapping networks having differing criticality, according to some embodiments disclosed herein.

FIG. 3 depicts an example environment 300 with overlapping networks having differing criticality, according to some embodiments disclosed herein. Although network criticality is discussed with reference to the environment 300, the evaluations and operations discussed above with reference to FIG. 2 may also or alternatively be performed for the environment 300.

As illustrated, an AP 120A provides connectivity for a network 305A, while APs 120B and 120C provide the network 305B. In the illustrated example, the environment 300 includes multi-domain wireless systems that utilize overlapping wireless spectrum, such as Wi-Fi, Fluidmesh, LTE-U, and the like. In some embodiments, the networks 305 are each controlled or managed by the same organization, allowing relative priority or criticality to be defined between them.

In an embodiment, each wireless system (e.g., APs 120A, 120B, and 120C) can use default media access methods and techniques during ordinary operations (e.g., when no contention or interference is present). The controller 105 can act as a multi-domain wireless controller (MDWC), and connect (e.g., via APIs) to the deployed wireless systems (e.g. to a Wi-Fi controller for the AP 120A, and/or to a Fluidmesh controller for the APs 120B and 120C).

In the environment 300, the controller 105 can collect various details and characteristics of the networks 305 or deployed systems, such as their geographical context (e.g., showing the locations of the systems and possible overlap), configuration details (e.g., RRM details), current use or requirements of the spectrum, and the like.

In the illustrated embodiment, a user or administrator can express intent of each network 305 to the controller 105, where the intent is a categorization of how each system is intended to be used, and/or the relative criticality of each. This may be done, for example, by identifying the intended use of each segment of each system (e.g. backhaul, access, mesh, workgroup bridge, IoT data collection, and the like).

In some embodiments, the intent description can also include details of the type and use of applications which are dependent on each system/network 305, and the criticality of these applications. For example, the backhaul system (e.g., provided by APs 120B and 120C in network 305B) may be intended for video backhaul or other applications, and may have a minimum bandwidth/performance requirement, thus leading to a relatively higher prioritization as compared to other systems. For example, a role of "backhaul" may be ranked highest, "mobile access" may be ranked second, and IoT sensor data collection may be ranked third. Thus, the user may specify, for each network 305, the role, criticality, minimum bandwidth, and the like.

In one embodiment, the controller 105 collects and examines telemetry data from each network 305, and determines if the wireless systems are competing for the wireless spectrum, the CU impact of the overlap, and/or how much additional spectrum is needed to meet performance demands. In some embodiments, the controller 105 also examines the communication patterns (e.g., mean frame size and rate of individual links), and how much each network 305 is delaying or affecting the other as it transmits a frame. Generally, these and other techniques can be used to return a measurement of how much contention exists between the networks 305 (e.g., how much RF pressure is being exerted by one system on the other, or how much spectrum overlap is occurring).

Based on the defined intents, the controller 105 can then arbitrate the wireless radio resources for the competing systems, as discussed above. For example, the controller 105 may first attempt to give wide separation of the channel assignments to each AP 120, thereby reducing chances of co-channel interference.

However, if channel demand is still causing contention between the networks 305, in some embodiments, the controller 105 can implement a closed-loop control function to optimize channel use according to intent/role, thereby reducing the incidence of co-system overlap. In one such embodiment, the controller 105 seeks to provide optimal channel access to systems with more critical functions (e.g., to backhaul networks 305) over the lower priority systems (e.g., ordinary access networks 305), while still balancing the needs of all systems in order of their criticality.

For example, an access Wi-Fi network (e.g., network 305A provided by AP 120A) may have its channel width reduced from 160 MHz to 80 MHz or 40 MHz in order to preserve critical backhaul functions in the network 305B. However, if traffic volumes diminish on the backhaul (and/or if traffic demands increase on the Wi-Fi system), the controller 105 may tilt the bandwidth allocation towards the AP 120A, as long as the more critical system (on the network 305B) experiences no performance degradation.

In an embodiment, the controller 105 can continually monitor performance metrics and characteristics of both systems to ensure the relevant needs are being met based on their spectrum allocation and channel assignment. This continual feedback and arbitration thereby optimizes the available spectrum for the various needs of the wireless systems, and align them as closely as possible to their expressed intent/criticality.

Figure 4:
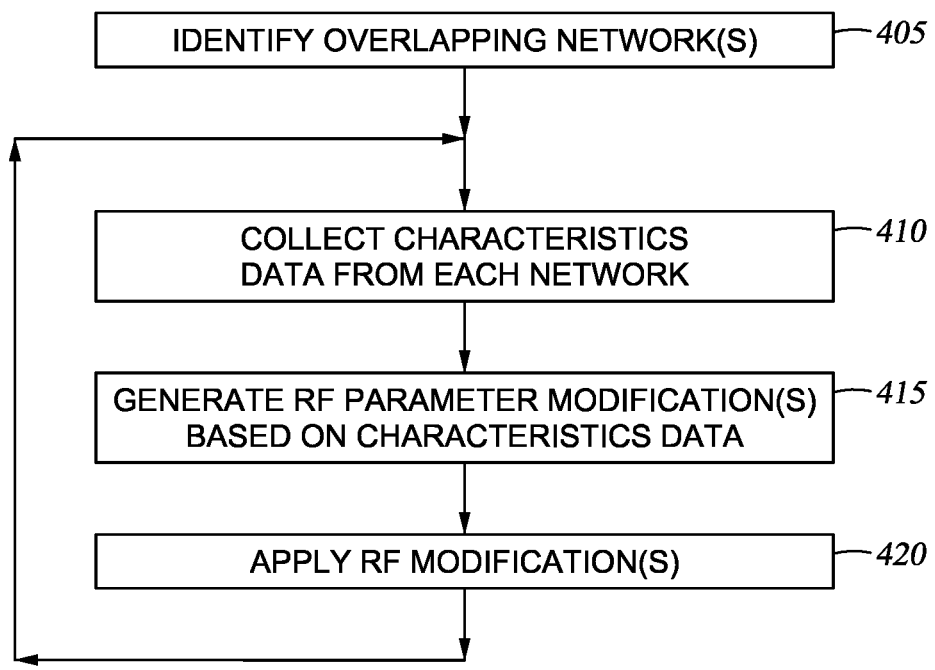
FIG. 4 is a flow diagram depicting a method for generating and applying wireless parameters to reduce network contention, according to some embodiments disclosed herein.

FIG. 4 is a flow diagram depicting a method 400 for generating and applying wireless parameters to reduce network contention, according to some embodiments disclosed herein.

The method 400 begins at block 405, where a controller (e.g., the controller 105 depicted in FIG. 1) identifies overlapping networks. As discussed above, the controller may identify the overlapping networks in a variety of ways, including by evaluating network telemetry from each, using sensor devices in the space, and the like. In some embodiments, identifying the overlapping networks also includes determining that the overlap or contention exceeds a threshold value that justifies use of the shared RF control.

At block 410, the controller collects characteristics data from each network. For example, as discussed above, the controller may identify the role or criticality of each network. In some embodiments, the controller can identify characteristics of the clients or traffic on each network, such as the client capabilities, weakest signal strength(s), transmission patterns, and the like. Some example techniques for characteristic collection and evaluation are discussed in more detail below with reference to FIGS. 5 and 6.

The method 400 then continues to block 415, where the controller generates one or more RF parameter modifications based on the collected characteristics. For example, as discussed above, the controller may modify the channel assignments, channel widths, power settings, and the like of one or more of the APs in order to reduce channel interference and contention. An example technique for RF modification is discussed in more detail below with reference to FIG. 7.

At block 420, the controller applies the generated RF modifications. In some embodiments, this includes directly instructing each AP to implement the modifications. In another embodiment, this includes transmitting the modifications to the relevant controller(s) of each AP. Additionally, in various embodiments, applying the RF changes may include affirmatively instructing one or more networks to implement them, providing them as suggested parameters, and the like.

Figure 5:
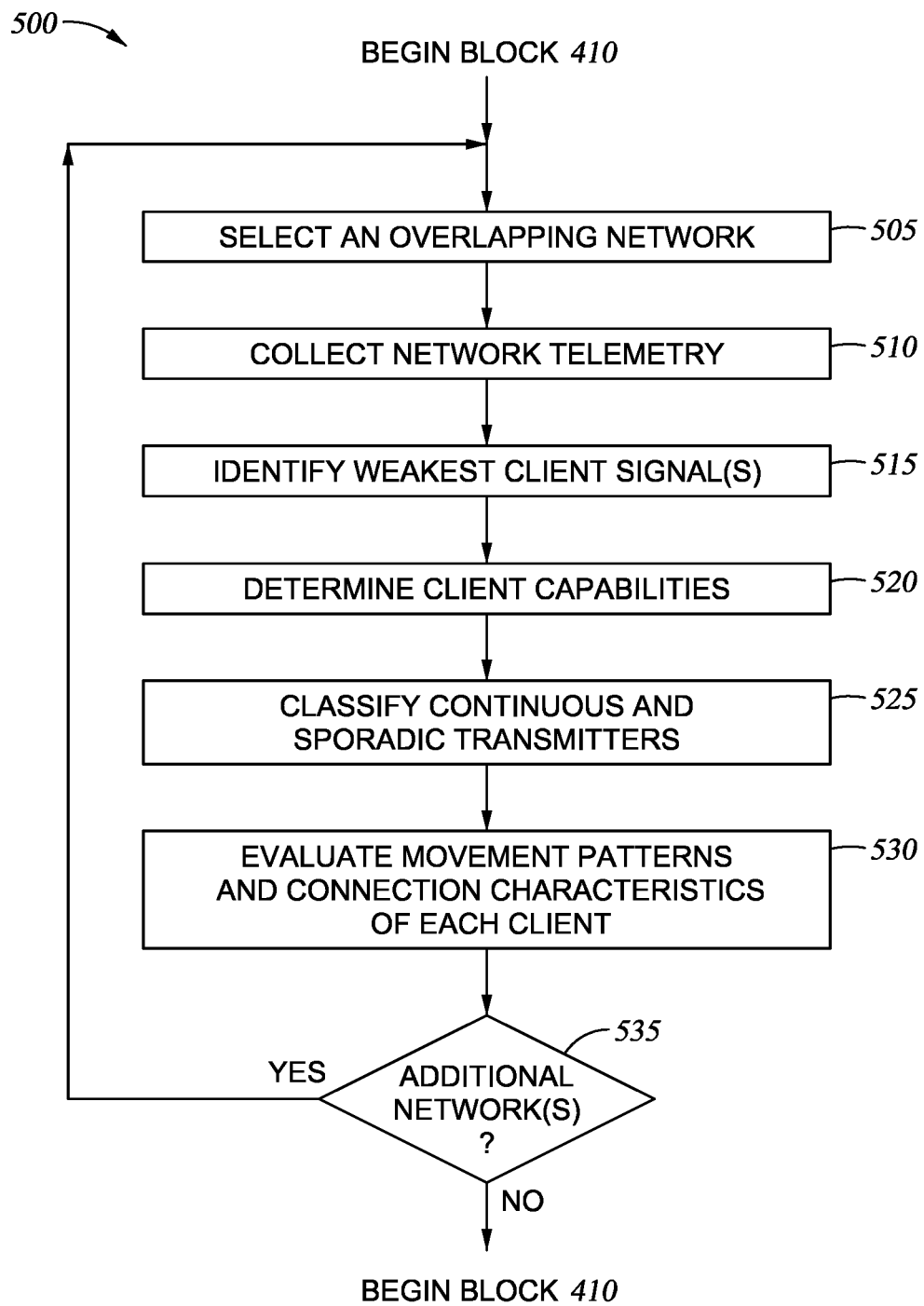
FIG. 5 is a flow diagram depicting a method for collecting and evaluating network data including connection characteristics, according to some embodiments disclosed herein.

FIG. 5 is a flow diagram depicting a method 500 for collecting and evaluating network data including connection characteristics, according to some embodiments disclosed herein. In the illustrated example, the method 500 provides additional detail for block 410 of FIG. 4.

The method 500 begins at block 505, where a controller (e.g., the controller 105 of FIG. 1) selects an overlapping network. That is, the controller selects a network, from the set of overlapping networks, for processing. In embodiments, this selection may be performed according to a variety of criteria, as all overlapping networks (or all overlapping networks over which the controller has control) will be processed in turn. Additionally, though the illustrated example depicts an iterative process (evaluating each network in turn), in some aspects, some or all of the networks may be evaluated in parallel.

At block 510, the controller collects telemetry for the selected network. Generally, the network telemetry can be used to evaluate or determine the health or state of the network. For example, the controller may use the telemetry to identify networks that are overlapping or otherwise suffering from contention.

At block 515, the controller identifies the client device having the weakest connection (e.g., the lowest received signal strength indicator (RSSI)) to the network. In some aspects, this is performed on a per-AP basis. That is, if the selected network has multiple APs, the controller can identify, for each AP, the lowest signal strength. In some embodiments, this determination is made by observing the characteristics over a period of time. For example, the controller may determine the weakest signal in a 24 hour period. Additionally, in some embodiments, the controller determines the weakest signal for each of a set of time periods. For example, for each hour-long period, the controller may identify the weakest client signal during that hour. This information can be used to set the minimum power for the AP during that hour.

At block 520, the controller determines the capabilities of the clients connected to the selected network. As discussed above, in some embodiments, this includes identifying client capabilities during each period of a set of time periods, allowing the controller to configure the network differently at different times. Further, in some embodiments, this evaluation is similarly performed on a per-AP basis, allowing more granular control of the network. Based on the client capabilities at a given time, the controller may modify the parameters of the AP while ensuring that the relevant clients are still able to connect.

At block 525, the controller classifies one or more client devices as either continuous transmitters or sporadic transmitters. As discussed above, for example, some devices such as IoT sensors may transmit updates relatively continuously, while others such as laptops use the network more sporadically (but often more intensely). As above, in some embodiments, this determination is made on a per-AP basis, and/or independently for each time slice. Based on this information, as discussed above, the controller can further refine the RF parameters for each AP.

At block 530, the controller evaluates movement patterns and/or connection characteristics of one or more client devices on the network. As discussed above, this may include, for example, identifying the timing of when client devices enter and leave the area (e.g., based on signal strength or quality over time). This information may be gathered on a per-AP basis as well, and may be used to generate timelines of use in the network.

Once the network characteristics have been determined, the method 500 continues to block 535, where the controller determines whether there is at least one additional network that has not yet been evaluated. If so, the method 500 returns to block 505 to select another network for processing. If all the overlapping networks have been evaluated, the method 500 terminates.

Figure 6:
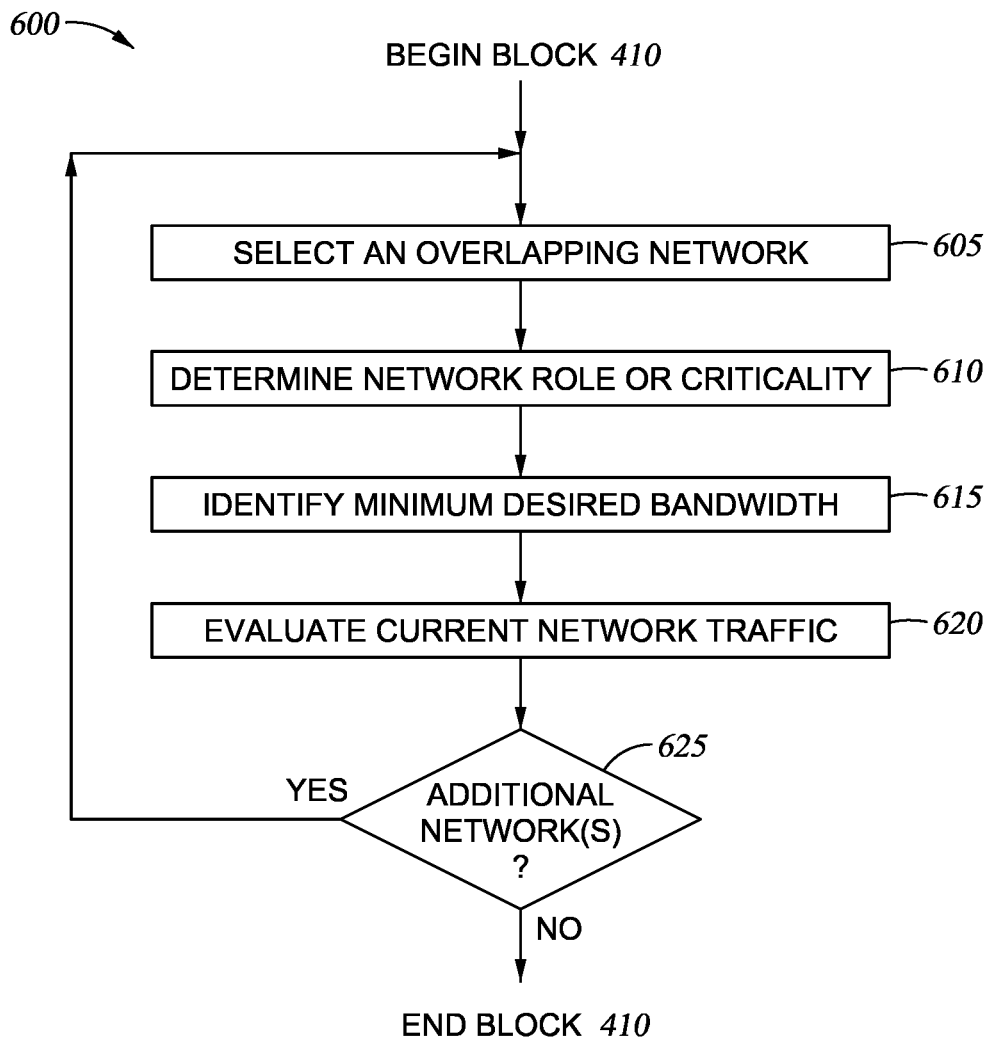
FIG. 6 is a flow diagram depicting a method for collecting and evaluating network characteristics including traffic criticality, according to some embodiments disclosed herein.

FIG. 6 is a flow diagram depicting a method 600 for collecting and evaluating network characteristics including traffic criticality, according to some embodiments disclosed herein. In the illustrated example, the method 600 provides additional detail for block 410 of FIG. 4.

The method 600 begins at block 605, where a controller (e.g., the controller 105 of FIG. 1) selects an overlapping network. That is, the controller selects a network, from the set of overlapping networks, for processing. In embodiments, this selection may be performed according to a variety of criteria, as all overlapping networks (or all overlapping networks over which the controller has control) will be processed in turn. Additionally, though the illustrated example depicts an iterative process (evaluating each network in turn), in some aspects, some or all of the networks may be evaluated in parallel.

At block 610, the controller determines the role and/or criticality of the selected network. For example, as discussed above, an administrator may define the intent for each network based on its role or type (e.g., backhaul, access, and the like). Generally, each role or criticality is associated with a corresponding priority, instructing the controller to prioritize network resources (e.g., channel assignments and width) to the networks based on their role to ensure that the more critical aspects (such as backhaul) are not harmed.

At block 615, the controller identifies any minimum desired or preferred bandwidth associated with the network. For example, as above, the administrator may define the minimum preferred bandwidth. The controller can consider this minimum when modifying the RF parameters of the network, ensuring that the minimum standards are met even if there is little traffic (or, in some cases, even if doing so will cause the more critical network(s) to suffer).

At block 620, the controller evaluates the current network traffic for the selected network. For example, the controller can determine the current congestion, channel utilization, and the like. This information can be used to help drive RF modifications. For example, when traffic surges on a lower-priority network and recedes on a higher-priority network, the controller may reallocate resources to benefit the lower-priority network for some time, allowing it to serve the higher traffic (without harming the higher-priority network).

The method 600 then continues to block 625, where the controller determines whether there is at least one additional network that has not yet been processed. If so, the method 600 returns to block 605. Otherwise, the method 600 terminates.

Figure 7:
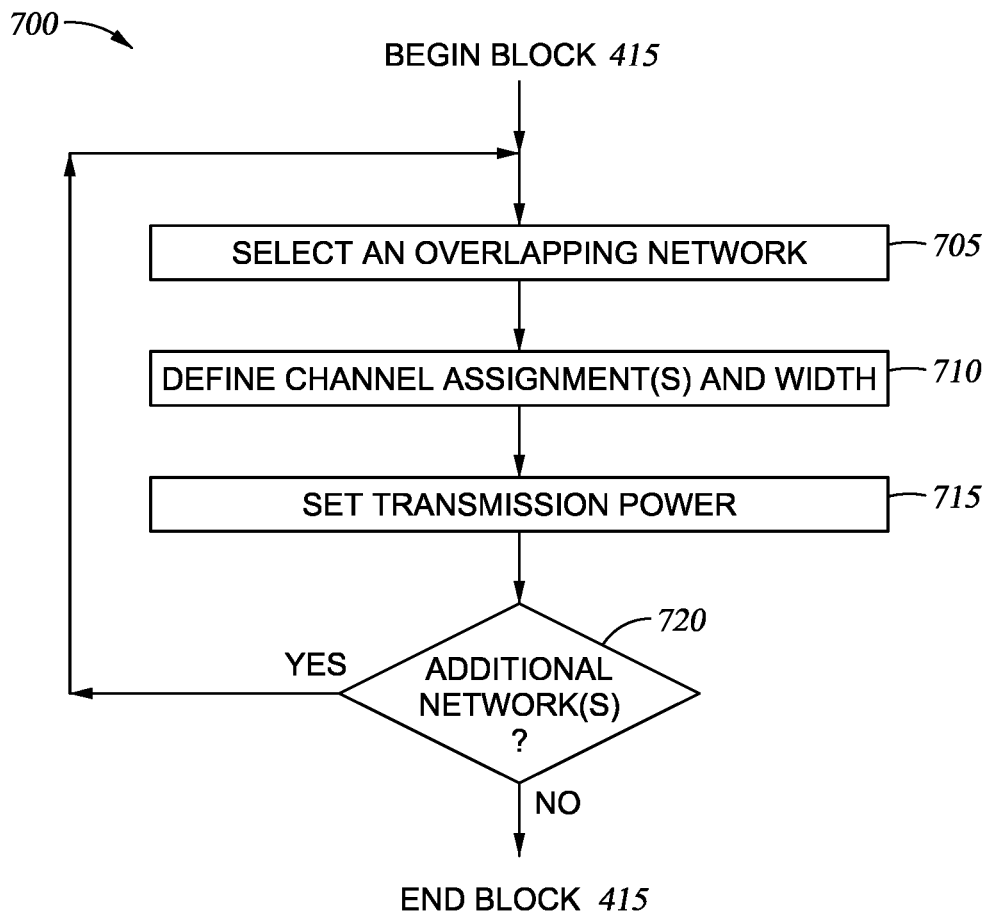
FIG. 7 is a flow diagram depicting a method for dynamically controlling network parameters to reduce contention, according to some embodiments disclosed herein.

FIG. 7 is a flow diagram depicting a method 700 for dynamically controlling network parameters to reduce contention, according to some embodiments disclosed herein. In the illustrated example, the method 700 provides additional detail for block 415 of FIG. 4.

The method 700 begins at block 705, where a controller (e.g., the controller 105 of FIG. 1) selects an overlapping network. That is, the controller selects a network, from the set of overlapping networks, for processing. In embodiments, this selection may be performed according to a variety of criteria, as all overlapping networks (or all overlapping networks over which the controller has control) will be processed in turn. Additionally, though the illustrated example depicts an iterative process (evaluating each network in turn), in some aspects, some or all of the networks may be evaluated in parallel.

At block 710, the controller defines channel assignments and/or channel widths for the selected network. In some embodiments, as discussed above, this assignment is performed on a per-AP basis. That is, if the selected network includes more than one AP, the controller may define channel assignments and widths to each AP individually. This can allow more granular control of the network. In some embodiments, as discussed above, defining the channel assignments and channel widths can be performed to improve network performance (e.g., allocating wider bandwidth when traffic demands are higher and lower width when demands are lower) while ensuring that the connected devices can still communicate via the network (e.g., such that the capabilities of the devices align with the assignments). Further, in some embodiments, this definition is performed on a per-time slice basis. That is, the controller may define channel and width assignments for each defined window of time of a plurality of windows At block 715, the controller sets the transmission power for the network (or, as discussed above, for each AP in the network). In some embodiments, as discussed above, this selection is performed on a per-time slice basis. That is, the controller may define power settings for each defined window of time of a plurality of windows. This can allow the controller to dynamically scale AP power at various times for various networks, thereby reducing contention and improving overall network performance.

Figure 8:
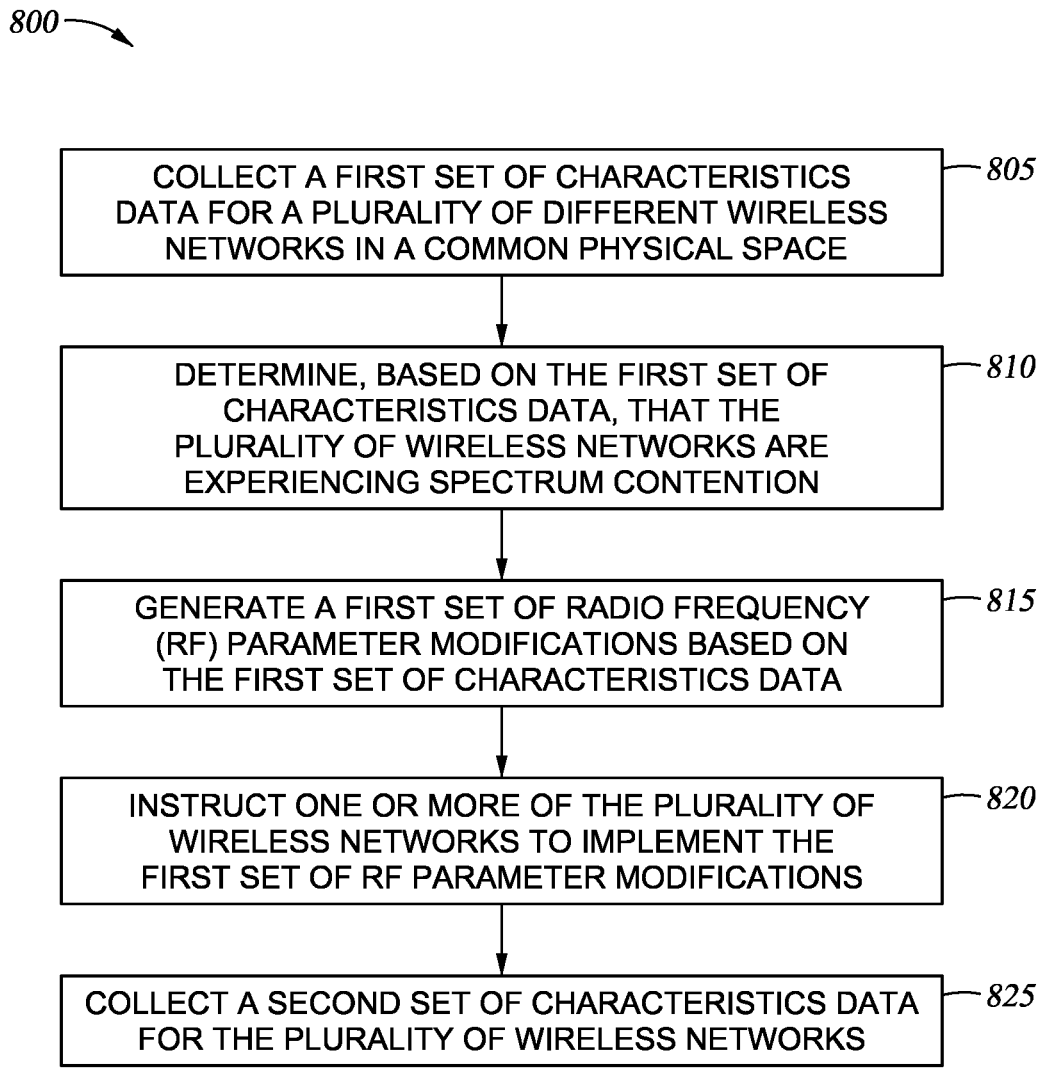
FIG. 8 is a flow diagram depicting a method for generating improved radio parameters, according to some embodiments disclosed herein.

FIG. 8 is a flow diagram depicting a method 800 for generating improved radio parameters, according to some embodiments disclosed herein.

At block 805, a system (e.g., the controller 105 of FIG. 1) collects a first set of characteristics data for a plurality of different wireless networks in a common physical space. For example, this may correspond to block 410 of FIG. 4, in some embodiments.

At block 810, the system determines, based on the first set of characteristics data, that the plurality of wireless networks are experiencing spectrum contention. For example, this may correspond to block 405 of FIG. 4, in some embodiments.

At block 815, the system generates a first set of radio frequency (RF) parameter modifications based on the first set of characteristics data. For example, this may correspond to block 415 of FIG. 4, in some embodiments.

At block 820, the system instructs one or more of the plurality of wireless networks to implement the first set of RF parameter modifications. For example, this may correspond to block 420 of FIG. 4, in some embodiments.

At block 825, the system collects a second set of characteristics data for the plurality of wireless networks. For example, this may correspond to block 410 of FIG. 4, in some embodiments.

Figure 9:
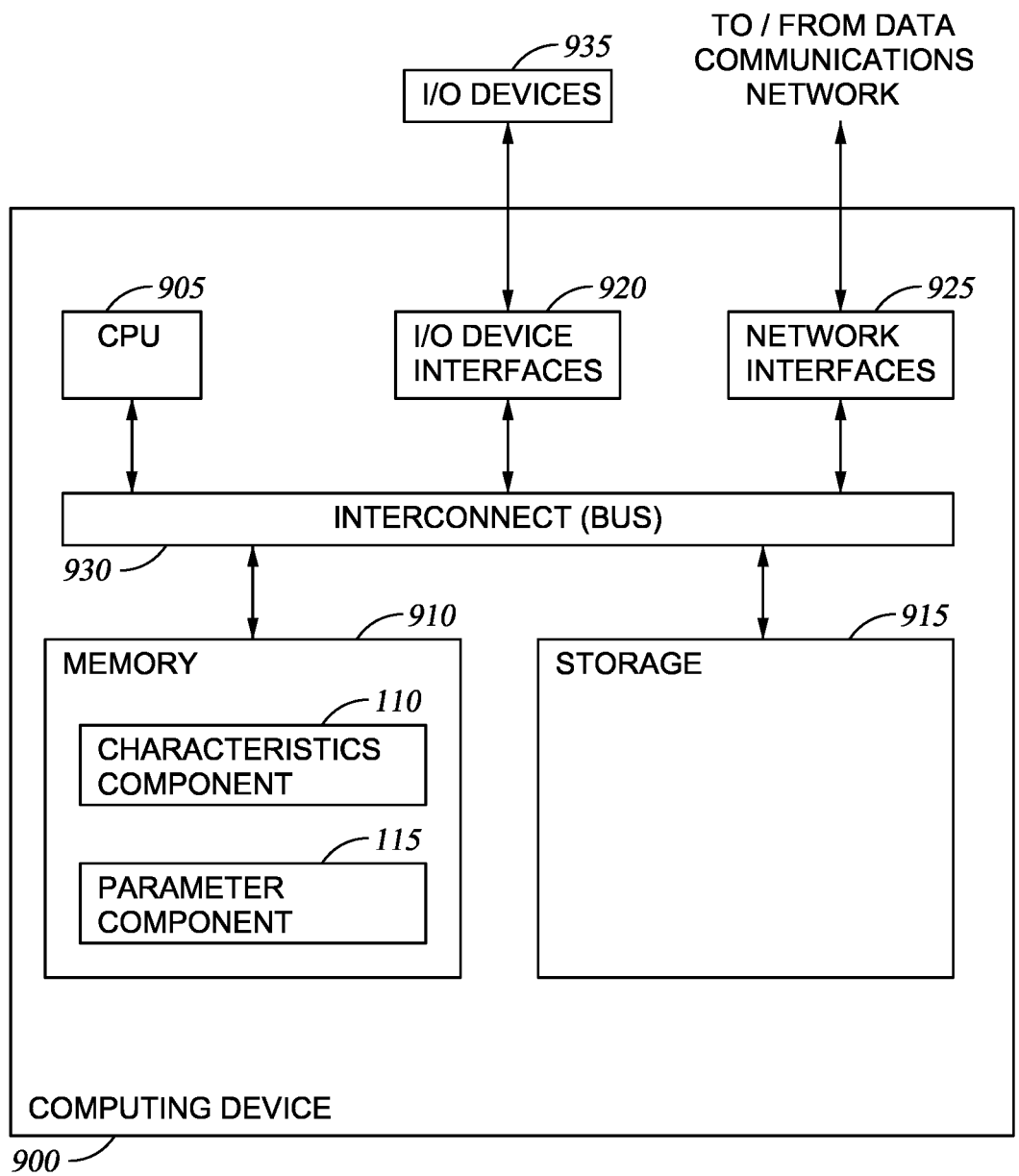
FIG. 9 is a block diagram depicting a computing device to provide coordinated resource management in overlapping networks, according to some embodiments disclosed herein.

FIG. 9 is a block diagram depicting a computing device 900 to provide coordinated resource management in overlapping networks, according to some embodiments disclosed herein. Although depicted as a physical device, in embodiments, the computing device 900 may be implemented using virtual device(s), and/or across a number of devices (e.g., in a cloud environment). In one embodiment, the computing device 900 corresponds to the controller 105 in FIG. 1.

As illustrated, the computing device 900 includes a CPU 905, memory 910, storage 915, a network interface 925, and one or more I/O interfaces 920. In the illustrated embodiment, the CPU 905 retrieves and executes programming instructions stored in memory 910, as well as stores and retrieves application data residing in storage 915. The CPU 905 is generally representative of a single CPU and/or GPU, multiple CPUs and/or GPUs, a single CPU and/or GPU having multiple processing cores, and the like. The memory 910 is generally included to be representative of a random access memory. Storage 915 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 935 (such as keyboards, monitors, etc.) are connected via the I/O interface(s) 920. Further, via the network interface 925, the computing device 900 can be communicatively coupled with one or more other devices and components (e.g., via a network, which may include the Internet, local network(s), and the like). As illustrated, the CPU 905, memory 910, storage 915, network interface(s) 925, and I/O interface(s) 920 are communicatively coupled by one or more buses 930.

In the illustrated embodiment, the memory 910 includes a characteristics component 110 and a parameter component 115, each discussed above with reference to FIG. 1, which may perform one or more embodiments discussed above. Although depicted as discrete components for conceptual clarity, in embodiments, the operations of the depicted components (and others not illustrated) may be combined or distributed across any number of components. Further, although depicted as software residing in memory 910, in embodiments, the operations of the depicted components (and others not illustrated) may be implemented using hardware, software, or a combination of hardware and software.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
    collecting a first set of characteristics data for a plurality of wireless networks in a common physical space;
    determining, based on the first set of characteristics data, that the plurality of wireless networks are experiencing spectrum contention;
    generating a first use timeline for at least a first wireless network of the plurality of wireless networks based at least in part on the first set of characteristics data, wherein the first use timeline indicates, for a plurality of time windows, typical network characteristics of the first wireless network;

generating a first set of radio frequency (RF) parameter modifications based on the first use timeline, comprising determining, for each respective wireless network of the plurality of wireless networks, whether respective connected devices of the respective wireless network are expected to correspond to continuous transmitter devices, sporadic transmitter devices, or both continuous and sporadic transmitter devices;

instructing one or more of the plurality of wireless networks to implement the first set of RF parameter modifications; and collecting a second set of characteristics data for the plurality of wireless networks.

2. The method of claim 1, wherein instructing the one or more of the plurality of wireless networks comprises performing cohesive radio resource management (RRM) to reduce spectrum contention among the plurality of wireless networks.

3. The method of claim 1, wherein generating the first set of RF parameter modifications based on the first use timeline comprises predicting changing network conditions for the first wireless network based on the first use timeline.

4. The method of claim 1, wherein generating the first use timeline comprises:
evaluating movement patterns of devices connected to the first wireless network; and
evaluating connection characteristic patterns of the devices connected to the first wireless network.

5. The method of claim 1, wherein instructing the one or more of the plurality of wireless networks to implement the first set of RF parameter modifications comprises:
reducing output power of a first access point of a first network, of the plurality of wireless networks, during a window of time; and
increasing output power of a second access point of a second network, of the plurality of wireless networks, during the window of time.

6. The method of claim 1, wherein determining that the plurality of wireless networks are experiencing spectrum contention comprises determining that a number of the plurality of wireless networks satisfies a defined maximum overlap threshold.

7. The method of claim 1, the method further comprising:
determining, for each respective wireless network of the plurality of wireless networks, a respective role, wherein the first set of RF parameter modifications are generated based at least in part on the determined roles.

8. The method of claim 7, further comprising:
determining a respective minimum bandwidth of each respective wireless network of the plurality of wireless networks, wherein the first set of RF parameter modifications are generated based at least in part on the determined minimum bandwidths.

9. The method of claim 7, further comprising:
determining a respective set of applications that communicate using each respective wireless network of the plurality of wireless networks, wherein the first set of RF parameter modifications are generated based at least in part on the determined sets of applications.

10. The method of claim 1, further comprising:
generating a second set of RF parameter modifications based on the second set of characteristics data.

11. A computer product comprising logic encoded in a non-transitory medium, the logic executable by operation of one or more computer processors to perform an operation comprising:
collecting a first set of characteristics data for a plurality of different wireless networks in a common physical space;
determining, based on the first set of characteristics data, that the plurality of wireless networks are experiencing spectrum contention;
generating a first use timeline for at least a first wireless network of the plurality of wireless networks based at least in part on the first set of characteristics data, wherein the first use timeline indicates, for a plurality of time windows, typical network characteristics of the first wireless network;
generating a first set of radio frequency (RF) parameter modifications based on the first use timeline, comprising determining, for each respective wireless network of the plurality of wireless networks, whether respective connected devices of the respective wireless network are expected to correspond to continuous transmitter devices, sporadic transmitter devices, or both continuous and sporadic transmitter devices;
instructing one or more of the plurality of wireless networks to implement the first set of RF parameter modifications; and
collecting a second set of characteristics data for the plurality of wireless networks.

12. The computer product of claim 11, wherein instructing the one or more of the plurality of wireless networks to implement the first set of RF parameter modifications comprises:
reducing output power of a first access point of a first network, of the plurality of wireless networks, during a window of time; and
increasing output power of a second access point of a second network, of the plurality of wireless networks, during the window of time.

13. The computer product of claim 11, wherein generating the first set of RF parameter modifications based on the first use timeline comprises predicting changing network conditions for the first wireless network based on the first use timeline.

14. The computer product of claim 11, the operation further comprising:
determining, for each respective wireless network of the plurality of wireless networks, a respective role, wherein the first set of RF parameter modifications are generated based at least in part on the determined roles.

15. The computer product of claim 14, the operation further comprising:
determining a respective minimum bandwidth of each respective wireless network of the plurality of wireless networks, wherein the first set of RF parameter modifications are generated based at least in part on the determined minimum bandwidths.

16. A system comprising:
one or more computer processors; and
logic encoded in one or more non-transitory media, the logic executable by operation of the one or more computer processors to perform an operation comprising:
collecting a first set of characteristics data for a plurality of different wireless networks in a common physical space;

determining, based on the first set of characteristics data, that the plurality of wireless networks are experiencing spectrum contention;

generating a first use timeline for at least a first wireless network of the plurality of wireless networks based at least in part on the first set of characteristics data, wherein the first use timeline indicates, for a plurality of time windows, typical network characteristics of the first wireless network;

generating a first set of radio frequency (RF) parameter modifications based on the first use timeline, comprising determining, for each respective wireless network of the plurality of wireless networks, whether respective connected devices of the respective wireless network are expected to correspond to continuous transmitter devices, sporadic transmitter devices, or both continuous and sporadic transmitter devices;

instructing one or more of the plurality of wireless networks to implement the first set of RF parameter modifications; and collecting a second set of characteristics data for the plurality of wireless networks.

17. The system of claim 16, wherein instructing the one or more of the plurality of wireless networks to implement the first set of RF parameter modifications comprises:

reducing output power of a first access point of a first network, of the plurality of wireless networks, during a window of time; and increasing output power of a second access point of a second network, of the plurality of wireless networks, during the window of time.

18. The system of claim 16, wherein generating the first set of RF parameter modifications based on the first use timeline comprises predicting changing network conditions for the first wireless network based on the first use timeline.

19. The system of claim 16, the operation further comprising:

determining, for each respective wireless network of the plurality of wireless networks, a respective role, wherein the first set of RF parameter modifications are generated based at least in part on the determined roles.

20. The system of claim 19, the operation further comprising:

determining a respective minimum bandwidth of each respective wireless network of the plurality of wireless networks, wherein the first set of RF parameter modifications are generated based at least in part on the determined minimum bandwidths.

* * * * *